United States Patent [19]
Coleman

[11] Patent Number: 4,552,090
[45] Date of Patent: Nov. 12, 1985

[54] BULK MATERIAL CONTAINER WITH A RIGID FOLLOWER

[75] Inventor: Clarence B. Coleman, Oakland, Calif.

[73] Assignee: Fabricated Metals, Inc., San Leandro, Calif.

[21] Appl. No.: 584,744

[22] Filed: Feb. 29, 1984

[51] Int. Cl.[4] .................. B65D 88/42; G01F 23/74
[52] U.S. Cl. ......................... 116/204; 73/308; 116/228; 220/93; 220/222
[58] Field of Search .......... 73/319, 317, 308, 313, 73/DIG. 5; 220/225, 226, 218, 216, 221, 222, 228, 93; 116/204, 228

[56] References Cited

U.S. PATENT DOCUMENTS

| | | | |
|---|---|---|---|
| 354,508 | 12/1886 | Fraleigh . | |
| 530,592 | 12/1894 | Kleritz | 73/308 X |
| 1,658,449 | 2/1928 | Loffler . | |
| 1,891,032 | 12/1932 | Venable . | |
| 1,981,434 | 1/1911 | Lander . | |
| 2,074,959 | 3/1937 | Guest | 73/82 |
| 2,677,816 | 5/1954 | Quist | 340/244 |
| 2,949,777 | 8/1960 | Ferron | 73/321 |
| 3,114,478 | 12/1963 | Hilkemeier et al. | 73/308 X |
| 3,136,444 | 6/1964 | Moyer | 220/226 |
| 3,159,301 | 12/1964 | Anderson | 220/93 X |
| 3,307,733 | 3/1967 | De Bock | 220/226 |
| 3,343,708 | 9/1967 | Haas | 220/225 |
| 3,618,812 | 11/1971 | Maeder | 15/246.5 X |
| 3,781,942 | 1/1974 | Coleman | 15/246.5 |
| 3,924,774 | 12/1975 | Donnelly | 220/93 |
| 3,942,526 | 3/1976 | Wilder et al. | 128/214 E |
| 3,964,312 | 6/1976 | Sebek | 73/314 |
| 4,147,274 | 4/1979 | Hall et al. | 220/226 |
| 4,185,336 | 1/1980 | Young | 200/84 C |
| 4,202,458 | 5/1980 | Gunther | 220/216 X |
| 4,290,059 | 9/1981 | Noyes et al. | 340/624 |
| 4,353,478 | 10/1982 | Clark | 220/226 X |
| 4,401,306 | 8/1983 | Arnold | 220/225 X |
| 4,413,747 | 11/1983 | Tenold et al. | 220/225 |
| 4,437,577 | 3/1984 | Myers et al. | 220/226 X |

FOREIGN PATENT DOCUMENTS

| | | | |
|---|---|---|---|
| 0653559 | 12/1962 | Canada | 220/226 |
| 0078520 | 6/1962 | France | 220/226 |
| 0248375 | 12/1963 | United Kingdom | 220/226 |

*Primary Examiner*—Daniel M. Yasich
*Attorney, Agent, or Firm*—Jack M. Wiseman

[57] ABSTRACT

A bulk material container comprising a shell made from suitable material, such as aluminum or stainless steel. Disposed within the shell is a floatable rigid follower. The vertical position of the floatable rigid follower varies with the level of flowable bulk material stored in the shell. The rigid follower comprises axially aligned, juxtaposed rigid sections with a flexible wiper secured therebetween. A permanent magnet is carried by the rigid follower for movement therewith and means responsive to a magnetic field are attached to the exterior of the shell to detect the height of the permanent magnet. Indicating means are responsive to the operation of the means responsive to a magnetic field for indicating the level of the rigid follower. In a modification of the bulk material container, the wiper is replaced by an inflatable seal and the floatable rigid follower provides a selectively positionable cover for the bulk material container.

10 Claims, 9 Drawing Figures

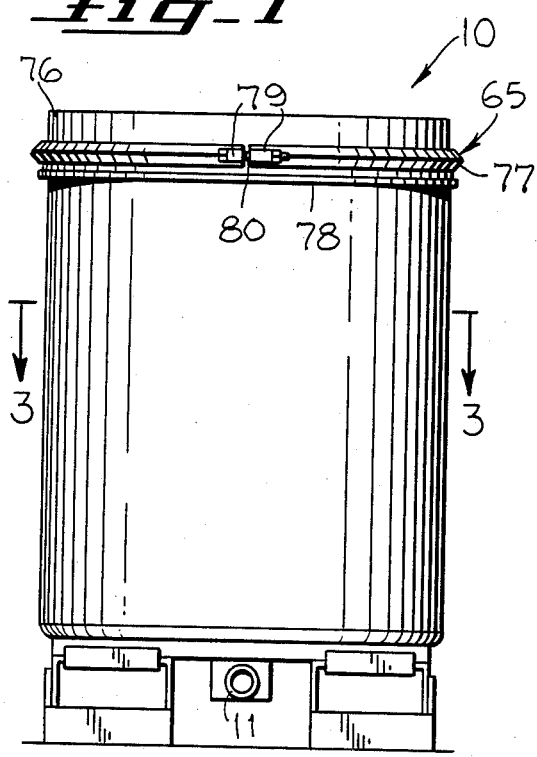
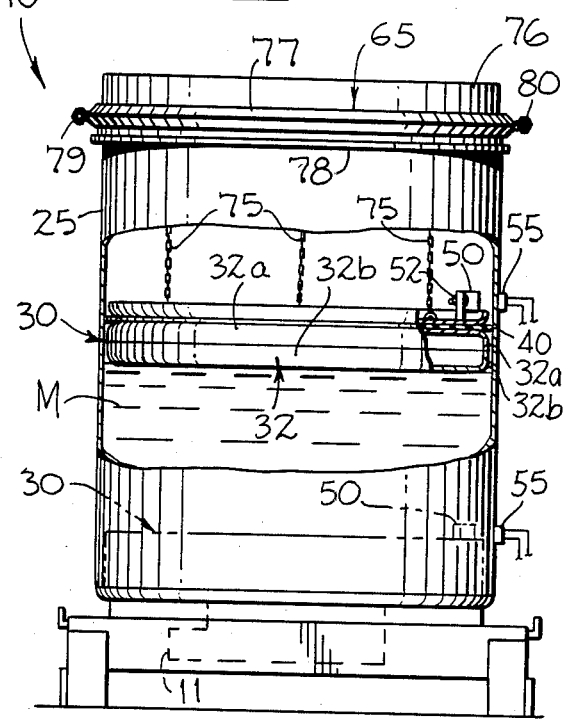
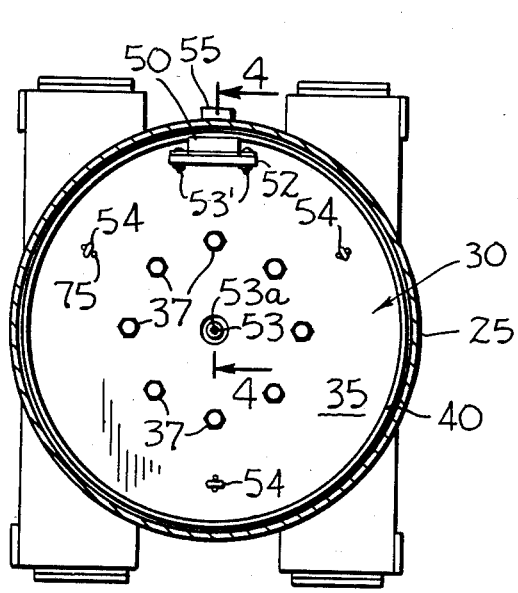
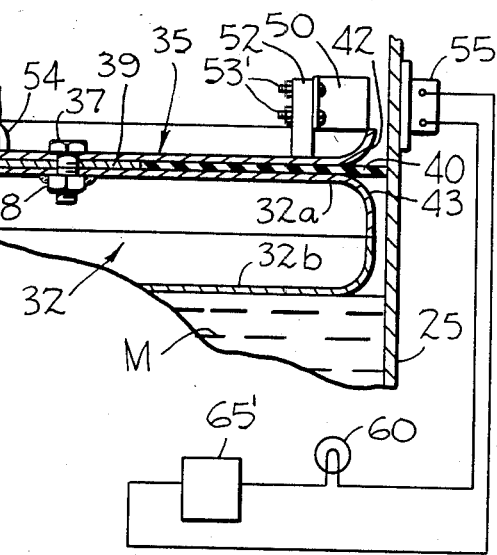

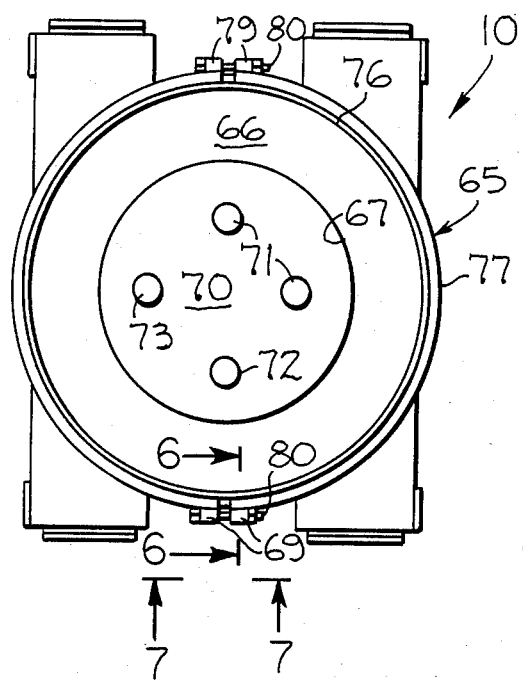
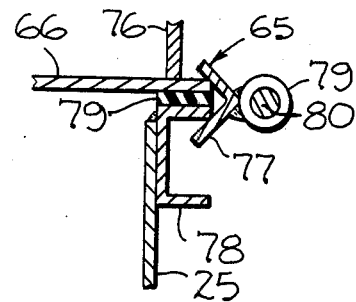
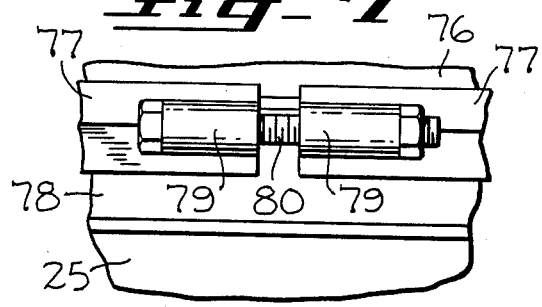
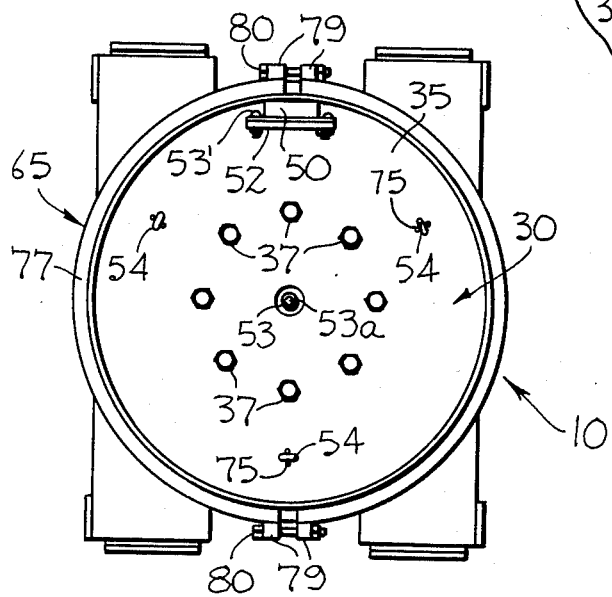
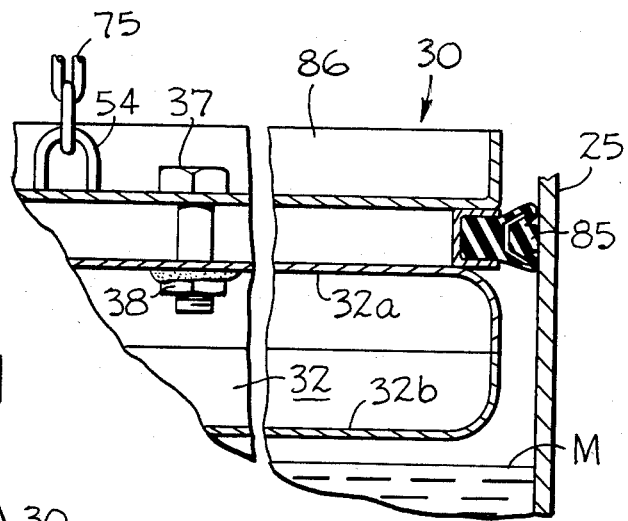

BULK MATERIAL CONTAINER WITH A RIGID FOLLOWER

BACKGROUND OF THE INVENTION

The present invention relates in general to bulk material containers, and more particularly to a bulk material container having a rigid follower therein.

In the patent to Coleman, U.S. Pat. No. 3,781,942, there is disclosed a container for bulk material. A flexible follower assembly is disposed within the container. The flexible follower freely follows the height of the bulk material within the container.

The patent to Kleritj, U.S. Pat. No. 530,592, issued on Dec. 11, 1894 for Magnetic Water Gauge, discloses a container for liquid. Mounted exteriorly of the container is a liquid level vessel which communicates with the container. The level of the liquid in the vessel follows the level of the liquid in the container. A float is disposed in the liquid vessel to follow the height of the liquid in the vessel. A magnet is carried by the float. Exteriorly of the vessel and mounted thereon is a tube. Disposed within the tube in vertically spaced relation are electrical switches. The height of the magnet selectively operates a switch within the tube. Certain of the switches are connected to an electrical alarm circuit.

The patent to Wilder et al., U.S. Pat. No. 3,942,525, issued on Mar. 9, 1976 for Alarm System for Intravenous Infusion Procedure, discloses a drop chamber in which is disposed a magnetic float. The float level reflects the height of the liquid in a container communicating with the drop chamber. A proximity switch is attached to the exterior of the drop chamber. When the liquid in the container falls below a predetermined height, the magnet in the magnetic float activates the proximity switch to operate an alarm.

The patent to Noyes et al., U.S. Pat. No. 4,290,059, issued on Sept. 15, 1981, for Liquid Level Alarm for Remotely Indicating When Less Than A Predetermined Quantity Of Fuel Oil Remains In A Storage Tank And Method Of Installing The Same, discloses a fuel storage tank and a fuel oil gauge. The gauge includes a tube. Within the tube is a magnetic disc attached to a rod. The rod extends into the storage tank and is mechanically actuated by a float disposed on the surface of the liquid in the storage tank. A magnetically actuated switch is mounted on the tube. When the level of the magnetic disc in the tube reaches a predetermined height, the magnetically actuated switch is operated to operate an alarm.

In the patent to Quist, U.S. Pat. No. 2,677,816, issued on May 4, 1954 for Floating Roof Tank Warning Device, there is disclosed a floating roof that follows the level of liquid in a storage tank. A vertically disposed liquid depth indicator is mounted exteriorly of the storage tank. One end of a cable is attached to a float mechanism incorporated in the floating roof. The other end of the cable is attached to a weight marker. Movement of the weight marker along the vertical indicator shows the level of the liquid in the container.

The patent to Anderson, U.S. Pat. No. 3,159,301, issued on Dec. 1, 1964, for Floating Diaphragm For Pressure Tanks, discloses a pressure tank with a floating diaphragm. A hollow buoyant float ring is mounted within the diaphragm. The float ring is formed from complementary half sections which are water-tight and fluid tight. The half sections are hinged together.

In the pending U.S. application, Ser. No. 06/557,045, filed on Dec. 1, 1983, for Level Indicator For Liquid Container With A Follower, by the applicant of the present application, there is disclosed a bulk material container in which a permanent magnet is carried by a follower for movement therewith. Means responsive to the magnetic field produced by the permanent magnet is attached to the exterior of the shell, in which the follower is disposed, to detect the height of the permanent magnet. The present application and said application, Ser. No. 06/557,045, have common assignees.

SUMMARY OF THE INVENTION

A bulk material container in which is disposed a rigid material level follower. The vertical position of the rigid follower within the shell of the bulk material container varies with the level of the bulk material within the shell or can be selectively positioned.

A feature of the present invention is that a magnet is carried by the rigid follower at the perimeter thereof radially spaced from the axis thereof. Means responsive to a magnetic field of the magnet are mounted on the exterior of the shell adjacent the path of travel of the magnet to be activated by the magnet advancing to a preselected height.

Another feature of the present invention is the provision of a magnet for indicating the height of bulk flowable material in a shell suitable for storing bulk viscous material, such as grease, ink, pigment and the like.

Another feature of the present invention is that a rigid follower not only wipes the wall of the shell of the container as it follows the surface of the bulk material removed from the shell, but also carries the magnet in its movement in the shell.

Another feature of the present invention is the construction of a rigid floatable follower in which a yieldable wiper is disposed between confronting rigid elements and extends radially outward of the confronting rigid elements. The extent at which the wiper flexes is guided by the contour of the confronting rigid elements.

Another feature of the present invention is that the rigid floatable follower provides a cover that can be selectively positioned for the container by replacing the wiper thereof by an inflatable seal. When the seal is deflated, the rigid floatable follower follows the height of the level of the bulk material stored in the container as a movable cover. When the seal is inflated, the rigid follower is fixedly positioned in the container to provide a cover for the container and to define the storage capacity for the container.

DESCRIPTION OF THE DRAWINGS

FIG. 1 is an elevation view of the bulk material container embodying the present invention.

FIG. 2 is a fragmentary elevation view of the bulk material container shown in FIG. 1 with a section thereof cut-a-way to illustrate the floatable rigid follower, the magnet carried therewith, and the magnetic switch mounted exteriorly of the shell of the bulk material container.

FIG. 3 is a horizontal sectional view of the bulk material container shown in FIG. 1 taken along line 3—3 of FIG. 1.

FIG. 4 is an enlarged fragmentary vertical sectional view of the floatable rigid follower shown with a section of the shell of the bulk material container to illustrate the magnet carried on the floatable rigid follower and an enlarged illustration of the magnetic switch mounted exteriorly of the shell of the bulk material container shown with a diagrammatic illustration of an electrical circuit for indicating the height of the floatable rigid follower.

FIG. 5 is a plan view of the bulk material container shown in FIG. 1.

FIG. 6 is a vertical section taken along line 6—6 of FIG. 5 to illustrate a locking ring for the bulk material container shown in FIG. 1.

FIG. 7 is an elevation view of the locking ring shown in FIG. 6 taken along line 7—7 of FIG. 5.

FIG. 8 is a plan view of a modification of the bulk material container shown in FIGS. 1-5 in which the floatable rigid follower serves as a selectively positioned cover for the container.

FIG. 9 is an enlarged fragmentary vertical sectional view of the positionable rigid follower for the bulk material container shown in FIG. 8.

DETAILED DESCRIPTION OF THE PREFERRED EMBODIMENTS

Illustrated in FIGS. 1 and 2 is a bulk material container 10 holding viscous material M (FIGS. 2 and 4) in the process of either being withdrawn or placed into a shell 25 of the container 10 through a conduit 11 (FIG. 1) by means of a suitable pump assembly, not shown. In the preferred embodiment, the pump assembly is an exterior pump. The shell 25 of the container 10 may be made of suitable material, such as plastic, mild steel, stainless steel or aluminum.

A rigid follower 30 (FIGS. 2-4) is disposed in the shell 25 of the container 10 and follows the level of the surface of the material M. The floatable rigid follower 30 comprises a buoyant, hollow cylindrical body 32 with contiguous half sections 32a and 32b. The body 32, in the preferred embodiment, is made of plastic, aluminum or stainless steel. The outer diameter of the body 32 is slightly less than the inner diameter of the shell 25. The rigid follower 30 also comprises a dish-shaped plate 35, which in the preferred embodiment, is made of aluminum or stainless steel. The plate 35 has a diameter substantially equal to the diameter of the body 32. While the follower, in the exemplary embodiment, has a cylindrical configuration, it is apparent that the follower can have other suitable configurations conforming to the cross-sectional contour of the shell.

Disposed between the body 32 and the plate 35 is a flexible, annular wiper 40 (FIGS. 2 and 4) made of suitable material, such as neoprene or rubber. A cylindrical spacer 39 (FIG. 4) is disposed in the opening of the annular wiper 40 for reducing distortion at the outer edge of the wiper 40. The wipe 40 is secured between the body 32 and the plate 35 by means of bolts 37 and nuts 38 arranged in a circle with spacer 39. The wiper 40 is held by the rigid follower 30 so as not to distort the outer edge thereof. The bolts 37 extend through the plate 35, through the spacer 39 and into the section 32a of the body 32. Preferably, the nuts 38 are welded to the section 32a at the inner wall thereof and the heads of the bolts 37 are secured against the plate 35. The thickness of the spacer 39 and the wiper 40 are such that when the bolts 37 and the nuts 38 secure the plate 35 and the section 32a of the body 32 together in a tight fitting relation, the wiper 40 is securely disposed between the plate 35 and the body 32. After the bolts 37 and the nuts 38 are installed, the section 32b of the body 32 is secured in fluid tight relation with the section 32a by suitable means, such as welding.

The wiper 40 extends radially outwardly from the body 32 and the plate 35 for engaging the inner wall of the shell 25 in a wiping action. Confronting walls 42 and 43 (FIG. 4) of the dish-shaped plate 35 and the section 32a, respectively, are curved along the periphery thereof. The wall 42 is curved upwardly and outwardly at the perimeter thereof, while the wall 43 is curved downwardly and outwardly at the perimeter thereof. The perimeter of the wiper 40 extends between but radially outwardly of the curved portions of the walls 42 and 43. The wiper 40 along its perimeter is guided and restrained in its yieldable action by the contour of the perimeters of the walls 42 and 43 during the wiping action thereof against the inner wall of the shell 25.

Fixed to the top wall of the plate 35 is a suitable permanent magnet 50 (FIGS. 2-4). In the exemplary embodiment, the magnet 50 is secured to the top wall of the plate 35 by means of a block 52 that is secured to the top wall of the plate 35 by suitable means, such as weldment. Nuts and bolts 53' secure the magnet 50 to the block 52. In the exemplary embodiment, the magnet 50 is of the type manufactured by McMaster-Carr as catalogue No. 89 and has an approximate pull of 120 pounds. Mounted in the top wall of the plate 35 at the axial center thereof is a suitable coupling 53 with a plug 53a (FIGS. 3 and 4). Should it be desired to fill the body 32 with a gas or the like, the coupling 53 will provide the connection for the supply of gas or liquid. After the body 32 is filled with the gas, the coupling 53 is disconnected and the opening is sealed with plug 53a. Spaced radially outward from the coupling 53 at equi-angular distances apart are U-shaped bolts 54. The bolts 54 are secured to the plate 35 by weldments.

Mounted on the outer wall of the shell 25 is suitable means responsive to a magnetic field, such as a magnetic switch 55 (FIGS. 2-4). The switch 55 can be fixed to the shell 25 or can be detachably secured to the shell 25. The height of the switch 55 can be selected dependent on the material level indicator function. The height of the switch 55 can be selected to indicate when the level of the material M in the shell 25 of the container 10 has dropped to a point requiring refilling or the replacement by a filled bulk material container or when the level of the material M in the shell 25 of the container 10 has reached a height requiring the cessation of the filling operation. The switch 55 can be moved vertically to determine the location of the height of the material M in the shell 25 of the container 10.

In the event of the shell 25 of the container 10 is made of material other than aluminum or stainless steel, such as mild steel or plastic, then the section of the shell 25 of the container 10 at which one or more of the magnetic switches 55 is located will be removed and replaced with a strip of material, such as stainless steel or aluminum, which will allow the magnetic flux lines to penetrate the shell 25. The replacement of the removed section of the shell 25 of the container 10 with a strip such as aluminum or stainless steel can be carried out by suitable means. More specifically, material that provides a path for the passage of a magnetic field or magnetic flux need not have a strip inserted into the shell 25. On the other hand, material that does not provide a suitable path for the passage of a magnetic field or magnetic flux does require the inserted strip.

Connected to each of the magnetic switches 55 is a suitable level indicator 60 (FIG. 4) such as a light or an alarm, or a relay to activate a level indicator, or a solenoid valve. In the exemplary embodiment, a suitable source of power 65' is connected in series with the magnetic switch 55 and the level indicator 60. It is within the contemplation of the present invention that the magnetic switches 55 can be in the form of a magnetic activated device that indicates level, such as a magnetically actuated flag.

A removable stacking ring 76 (FIGS. 1, 2, 5 and 6) encircles the shell 25 and is attached to a removable top plate 66.

A locking ring 65 (FIGS. 1, 2 and 5–7) secures the top plate 66 to the upper section of the shell 25. Formed in the top plate 66 is an access opening 67 (FIG. 5), which is of conventional size and type. In the bulk material container 10, the access opening 67 is generally large enough for an operator to pass through so as to inspect, repair and clean the interior of the shell 25. The access opening 67 of the container 10 receives a cover 70 made of suitable material, such as mild steel.

Formed in the cover 70 are openings for air ventilation plugs 71, for a vacuum relief valve 72 and for a pressure relief valve 73. In order to install the floatable rigid follower 30 into the shell 25 and to remove the rigid follower 30 from the shell 25, the top plate 66 along with the stacking ring 76 are removed from the shell 25. To raise and lower the floatable rigid follower 30 manually relative to the shell 25, chains 75 (FIGS. 2 and 4) are attached at one end to the U-bolts 54. At the other end, the chains 75 are detachably secured in a well-known manner to the bottom wall of the top plate 66. The length of the chains 75 is sufficient to permit the rigid follower 30 to be lowered within the shell 25 to the fullest extent.

The locking ring 65 (FIGS. 1, 2 and 5–7) comprises a split ring 77. Projecting from the confronting ends of the split ring 77 are ears 79. Received by each pair of confronting ears 79 is a threaded bolt 80. Suitable nuts threaded on the associated bolt 80 for each pair of confronting ears 79 hold the split ring 77 in a locked state. The locking ring 65, when in a locked state, holds the top plate 66 securely to a flange 78 (FIG. 6), which is welded to the top of the shell 25. An annular gasket 79 is disposed between the top plate 66 and the flange 78. For removing the top plate 66 from the shell 25, the nuts are removed from the associated bolts 80 and the bolts 80 are removed from the associated ears 79. Thereupon, the split ring 77 is removed from the top plate 66 and the flange 78.

The floatable rigid follower 30 may, in the alternative, be employed as a positionable cover for the shell 25 (FIGS. 8 and 9). To employ the floatable rigid follower 30 as a positionable cover for the shell 25, an annular inflatable seal 85 is secured between the plate 86 and the floatable body 32 in lieu of the wiper 40. The inflatable seal 85 is a conventional and well-known seal manufactured by Kirkhill Rubber Co. of Los Angeles, Calif., as catalogue number F-13763.

When the inflatable seal 85 is in a deflated state, the floatable rigid follower 30 is in constant contact with the surface of the bulk material M and follows the level of the bulk material M in the shell 25. When the inflatable seal 85 is inflated by a suitable gas, such as air, the rigid follower 30 remains at a fixed, adjustable height within the shell 25. The capacity of the container 10 is determined by the height of the rigid follower 30 within the shell 25.

The replacement of the wiper 40 by the inflatable seal 85 enables the rigid follower 30 to be used as a cover in place of a top plate, such as top plate 66, or be used in addition to a top plate. The height of the rigid follower 30 varies with the height of the level of the bulk material M in the shell 25, when the seal 85 is deflated. The height of the rigid follower 30 remains at a fixed, adjustable height when the seal 85 is inflated to set the fixed storage capacity for the container 10.

I claim:

1. A container for bulk material comprising:
   (a) a shell for storing bulk material, said shell being formed with a vertical inner surface;
   (b) a rigid, floatable follower disposed in said shell in constant contact with the upper surface of the bulk material stored in said shell, said follower comprising rigid members in axial alignment and a disk-shaped yieldable member secured between said rigid members for engaging continuously the inner surface of said shell; and
   (c) means on said shell disposed below said follower for removing bulk material from said shell, said yieldable member being a wiper for wiping the inner surface of said shell as bulk material is removed from said shell, said rigid members being in the form of a hollow body and a plate between which said wiper is secured, one of said rigid members being formed with a curved wall at the perimeter thereof for guiding the flexing action of said yieldable member at the perimeter thereof during the wiping of said inner surface of said shell.

2. A container as claimed in claim 1 and comprising means responsive to the movement of said rigid, floatable follower as said follower follows the level of the material in said shell, said means comprising a level indicator disposed on said follower interiorly of said shell to indicate the level of the material in said shell.

3. A container as claimed in claim 1 and comprising a magnet mounted on said rigid, floatable follower interiorly of said shell for movement therewith, and means responsive to the magnetic field of said magnet and supported by said shell exteriorly of said shell, said means responsive to the magnetic field of said magnet activated by the magnetic field of said magnet in response to said follower moving to the approximate height of said means.

4. A container as claimed in claim 1 wherein said rigid sections are secured together by fastening means and wherein said wiper has an annular configuration and wherein said wiper is secured between said rigid sections outwardly from the location of said fastening means.

5. A container as claimed in claim 1 and comprising a spacer member disposed in the axial opening of said annular wiper between said rigid sections.

6. A container for bulk material comprising:
   (a) a shell for storing bulk material, said shell being formed with a vertical inner surface;
   (b) a rigid, floatable follower disposed in said shell in constant contact with the upper surface of the bulk material stored in said shell, said follower comprising rigid members in axial alignment and a disk-shaped yieldable member secured between said rigid members for engaging continuously the inner surface of said shell, one of said rigid members being in the form of a hollow body; and
   (c) means in said shell disposed below said follower for removing bulk material from said shell, said yieldable member being a wiper for wiping the inner surface of said shell as bulk material is removed from said shell, said rigid members being formed with confronting walls curved at the perimeters thereof in opposite directions and said wiper being disposed between said walls for guiding the flexing action of said wiper at the perimeter thereof during the wiping of said inner surface of said shell.

7. A container as claimed in claim 6 and comprising a magnet mounted on said rigid, floatable follower interiorly of said shell for movement therewith, and means responsive to the magnetic field of said magnet and supported by said shell exteriorly of said shell, said means responsive to the magnetic field of said magnet activated by the magnetic field of said magnet in response to said follower moving to the approximate height of said means.

8. A container as claimed in claim 6 and comprising a magnet mounted on said plate interiorly of said shell for movement therewith, and means responsive to the magnetic field of said magnet and supported by said shell exteriorly of said shell, said means responsive to the magnetic field of said magnet activated by the magnetic field of said magnet in response to said plate moving to the approximate height of said means.

9. A container for bulk material comprising:
(a) a shell for storing bulk material, said shell being formed with a vertical inner surface;
(b) a rigid, floatable follower disposed in said shell in constant contact with the upper surface of the bulk material stored in said shell, said follower comprising rigid members in axial alignment and a disk-shaped yieldable member secured between said rigid members for engaging continuously the inner surface of said shell; and
(c) means on said shell disposed below said follower for removing bulk material from said shell, said yieldable member being a wiper for wiping the inner surface of said shell as bulk material is removed from said shell, said rigid members being in the form of a hollow body and a plate between which said wiper is secured, said plate being disposed above said body and being curved upwardly and outwardly at the perimeter thereof, said body being formed with an upper wall confronting said plate, said upper wall being curved downwardly and outwardly at the perimeter thereof, said wiper being disposed between said walls and projecting radially outwardly therefrom, said wiper being restrained by said walls at the perimeter thereof during the wiping of the inner surface of said shell.

10. A container for bulk material comprising:
(a) a shell for storing bulk material, said shell being formed with a vertical inner surface;
(b) a rigid, floatable follower disposed in said shell in constant contact with the upper surface of the bulk material stored in said shell, said follower comprising rigid members in axial alignment and a disk-shaped yieldable member secured between said rigid members for engaging continuously the inner surface of said shell;
(c) means on said shell disposed below said follower for removing bulk material from said shell, said yieldable member being a wiper for wiping the inner surface of said shell as bulk material is removed from said shell, said rigid members being in the form of a hollow body and a plate between which said wiper is secured, said plate being disposed above said body and being curved upwardly and outwardly at the perimeter thereof, said body being formed with an upper wall confronting said plate, said upper wall being curved downwardly and outwardly at the perimeter thereof, said wiper being disposed between said walls and projecting radially outwardly therefrom, said wiper being restrained by said walls at the perimeter thereof during the wiping of the inner surface of said shell;
(d) a magnet mounted on said rigid, floatable follower interiorly of said shell for movement therewith; and
(e) means responsive to the magnetic field of said magnet and supported by said shell exteriorly of said shell, said means responsive to the magnetic field of said magnet activated by the magnetic field of said magnet in response to said follower moving to the approximate height of said means.

* * * * *